(12) United States Patent
Cheng et al.

(10) Patent No.: US 10,608,276 B2
(45) Date of Patent: Mar. 31, 2020

(54) CARBON MATERIAL, ANODE MATERIAL AND SPACER ADDITIVE FOR LITHIUM ION BATTERY

(71) Applicant: NEC Corporation, Tokyo (JP)

(72) Inventors: Qian Cheng, Tokyo (JP); Noriyuki Tamura, Tokyo (JP); Kentaro Nakahara, Tokyo (JP)

(73) Assignee: NEC Corporation, Tokyo (JP)

( * ) Notice: Subject to any disclaimer, the term of this patent is extended or adjusted under 35 U.S.C. 154(b) by 181 days.

(21) Appl. No.: 15/506,817

(22) PCT Filed: Aug. 29, 2014

(86) PCT No.: PCT/JP2014/073422
§ 371 (c)(1),
(2) Date: Feb. 27, 2017

(87) PCT Pub. No.: WO2016/031084
PCT Pub. Date: Mar. 3, 2016

(65) Prior Publication Data
US 2017/0283265 A1  Oct. 5, 2017

(51) Int. Cl.
*H01M 10/0525* (2010.01)
*H01M 4/62* (2006.01)
(Continued)

(52) U.S. Cl.
CPC ......... *H01M 10/0525* (2013.01); *C01B 32/05* (2017.08); *C01B 32/182* (2017.08);
(Continued)

(58) Field of Classification Search
CPC ... C01B 31/0438; C01B 32/05; C01B 32/182; C01P 2004/61; H01M 10/052;
(Continued)

(56) References Cited

U.S. PATENT DOCUMENTS

2012/0064409 A1* 3/2012 Zhamu ............... B82Y 30/00
429/221
2013/0181172 A1 7/2013 Nishi et al.
(Continued)

FOREIGN PATENT DOCUMENTS

JP    2000-100453    4/2000
JP    2012-56833     3/2012
(Continued)

OTHER PUBLICATIONS

Z. Chen, W. Ren, L. Gao, B. Liu, S. Pei, H.-M. Cheng. Three-dimensional flexible and conductive interconnected graphene networks grown by chemical vapour deposition, Nature Materials, Jun. 2011, vol. 10, 424-428.*
(Continued)

*Primary Examiner* — Carlos Barcena
(74) *Attorney, Agent, or Firm* — Finnegan, Henderson, Farabow, Garrett & Dunner, L.L.P.

(57) ABSTRACT

The present invention provides a novel carbon material comprising a three-dimensional graphene network constituting a plurality of cells interconnecting as a whole, where at least one of the cells has single-layer graphene wall. The carbon material is suitable for a lithium ion battery.

15 Claims, 2 Drawing Sheets

(51) Int. Cl.
| | |
|---|---|
| *H01M 4/38* | (2006.01) |
| *C01B 32/20* | (2017.01) |
| *H01M 4/131* | (2010.01) |
| *H01M 4/587* | (2010.01) |
| *H01M 10/052* | (2010.01) |
| *C01B 32/05* | (2017.01) |
| *C01B 32/182* | (2017.01) |
| *H01M 4/36* | (2006.01) |
| *H01M 4/02* | (2006.01) |

(52) U.S. Cl.
CPC .......... *H01M 4/131* (2013.01); *H01M 4/364* (2013.01); *H01M 4/38* (2013.01); *H01M 4/587* (2013.01); *H01M 4/62* (2013.01); *H01M 10/052* (2013.01); *C01P 2004/61* (2013.01); *H01M 2004/027* (2013.01)

(58) Field of Classification Search
CPC ....... H01M 10/0525; H01M 2004/027; H01M 4/131; H01M 4/364; H01M 4/38; H01M 4/587; H01M 4/62
See application file for complete search history.

(56) References Cited

U.S. PATENT DOCUMENTS

| | | | |
|---|---|---|---|
| 2013/0266869 A1 | 10/2013 | Todoriki et al. | |
| 2014/0287310 A1* | 9/2014 | Oono .................... | H01M 4/625 |
| | | | 429/221 |

FOREIGN PATENT DOCUMENTS

| | | |
|---|---|---|
| JP | 2012-211069 | 11/2012 |
| JP | 2013-30462 | 2/2013 |
| JP | 2013-82606 | 5/2013 |
| JP | 2014-135259 | 7/2014 |
| WO | WO 2012/020561 A1 | 2/2012 |
| WO | WO 2014/069310 A1 | 5/2014 |

OTHER PUBLICATIONS

S. Numao et al., "Synthesis and characterization of mesoporous carbon nano-dendrites with graphitic ultra-thin walls and their application to supercapacitor electrodes", ScienceDirect, Carbon, vol. 47, pp. 306-312, Oct. 2008.

International Search Report and Written Opinion dated Nov. 25, 2014, in corresponding PCT International Application.

* cited by examiner

CARBON MATERIAL, ANODE MATERIAL AND SPACER ADDITIVE FOR LITHIUM ION BATTERY

CROSS-REFERENCE TO RELATED PATENT APPLICATIONS

This application is a National Stage Entry of International Application No. PCT/JP2014/073422, filed Aug. 29, 2014. The entire contents of the above-referenced application are expressly incorporated herein by reference.

TECHNICAL FIELD

The present invention relates to a carbon material suitable for an anode material and a spacer additive for a lithium ion battery. Particularly, the present invention relates to the carbon material comprising three-dimensional graphene network, an anode material or spacer additive including the carbon material.

BACKGROUND ART

Among all the rechargeable battery technologies, lithium-ion batteries (LIBs) offer superior performance, and are suitable for a main power source in portable electronics. LIBs are also the most promising power source for electric vehicles and are projected to be enablers of smart grids based on renewable energy technologies. For many of these applications, energy density and cycle life stand out as two important technical parameters which need significant improvements. For example, in 2010 the U.S. Department of Energy has put forth a goal to create a LIB with double the energy density of current batteries and a cycle life of 5000 cycles with 80% capacity retention for electric vehicles, in comparison, the typical high energy batteries used in portable electronics only have a cycle life of 500-1000 cycles. Increasing energy density in LIBs requires developing electrode materials with higher charge capacity or higher voltage. Improving cycle life involves stabilizing two critical components of battery electrodes: active electrode materials and their interface with electrolyte—so-called "solid-electrolyte interphase" (SEI).

Recently, silicon (Si) has emerged as one of the most promising electrode materials for next-generation high energy LIBs. It offers a suitable low voltage for an anode and a high theoretical specific capacity up to 4,200 mAh/g based on the formation of $Li_{4.4}Si$ alloy, which is 10 times higher than that of conventional carbon anodes (372 mAh/g corresponding to the formation of $LiC_6$). However, Si expands volumetrically by up to 400% upon full lithium insertion (lithiation) to form the $Li_{4.4}Si$ alloy, and the alloy can contract significantly to return Si upon lithium extraction (delithiation), creating two critical challenges associated with silicon-based anode materials: degradation of the mechanical integrity of Si anode materials and SEI stability.

Stress induced by the large volume changes causes cracking and pulverization of Si anode materials, which leads to loss of electrical contact and eventual capacity fading. This was considered to be main reason for rapid capacity loss in early studies of Si anode materials. Recently, there have been successes in addressing stability issues in these materials by designing nanostructured materials, including composites of carbon nanowires, carbon nanotubes, carbon nanoporous films with Si nanoparticle.

US 2012/0064409 A1 discloses a nano graphene-enhanced particulate that graphene sheets and anode active materials such as Si are mutually bonded or agglomerated. Due to their small size and open space surrounding Si nanoparticle, the strain in nanostructures can be easily relaxed without mechanical fracture. Similarly, JP 2013-30462A discloses a negative electrode comprising an alloy-based negative electrode material particle or an alloy-based negative electrode material whisker; and a carbon film including 1 to 50 graphene layers, wherein a surface of the alloy-based negative electrode material particle or the alloy-based negative electrode material whisker is covered with the carbon film.

JP 2012-056833A discloses a carbon nanostructure and metal-supported carbon nanostructure having a new structure used as a negative electrode material or the like of a lithium ion secondary battery. The carbon nanostructure is produced, in which carbon-containing rod-shaped materials and/or carbon-containing sheet-shaped materials are bound three-dimensionally to each other and alveolar-like voids partitioned by graphene multilayer membrane walls are formed in the rod-shaped materials and/or the sheet-shaped materials. The production method of the carbon nanostructure includes the steps of: blowing methyl acetylene gas into a solution containing a metallic salt to form rod-shaped crystalline materials and/or sheet-shaped crystalline materials of metallic methyl acetylide; conducting first thermal treatment for the rod-shaped crystalline materials and/or sheet-shaped crystalline materials to segregate metal of the metallic methyl acetylide and carbon of the rod-shaped crystalline materials and/or sheet-shaped crystalline materials so as to form carbon nanostructure intermediate which is configured such that carbon containing rod-shaped materials and/or sheet-shaped materials are bound three-dimensionally and then form metal encapsulated carbon nanostructure which encapsulates the metal in the carbon nanostructure intermediate; contacting the metal encapsulated carbon nanostructure with nitric acid; and conducting second thermal treatment for the metal encapsulated carbon nanostructure to blow off metal encapsulated in the metal encapsulated carbon nanostructure.

SUMMARY OF THE INVENTION

Here, we have intensively investigated the above issues and found a novel carbon material, which can be used for lithium ion battery, in which the carbon material includes three-dimensional (honeycomb) graphene network.

That is, one aspect of the present invention provides a carbon material including a three-dimensional graphene network constituting a plurality of cells interconnecting as a whole, where at least one of the cells has single-layer graphene wall.

Another aspect of the present invention provides an anode material for a lithium-ion battery including the above carbon material and active particles including at least one element that is able to store lithium ions.

Further another aspect of the present invention provides an anode material for a lithium-ion battery including the above carbon material and the above active particles embedded in the plurality of the cells, and amorphous carbon covering the carbon material.

Still another aspect of the present invention provides a negative electrode for a lithium-ion battery including active particles comprising at least one element that is able to store lithium ions and spacer additives provided between the active particles, wherein the spacer additives include the above carbon material.

Further still another aspect of the present invention provides a lithium ion battery including the above anode material or the negative electrode.

The carbon material of the aspect is extremely light weight and flexible so that it is suitable for LiBs, particularly anode materials or spacer additives.

MODES FOR CARRYING OUT THE INVENTION

Carbon Material

The carbon nanostructure of JP 2012-056833A has alveolar-like voids (cells) partitioned by graphene multilayer membrane walls. On the other hand, the carbon material of the present invention has cells partitioned by graphene single-layer walls. Further, conventional graphene sheets or platelets are two-dimensional material and different from three-dimensional graphene network. That is, the carbon material of the present invention is a novel material.

Fabrication Method 1

The fabrication procedure of the carbon material of the present embodiment is described below:

(a) An expandable graphite can be used as starting materials. The expandable graphite is a synthesized intercalation compound of graphite that expands or exfoliates when heated. This material is manufactured by treating flake graphite with various intercalation reagents that migrate between the graphene layers in a graphite crystal and remain as stable species. Such an expandable graphite is commercially available and is an intumescent material used as a flame retardant additive in plastics, foams, putties and coatings.

(b) The expandable graphite is heat treated in inert atmosphere to 200° C. to 500° C. with 1° C./min to 10° C./min and keep the reached temperature for several hours (e.g., 3 hours) to expand graphene layers.

(c) The expanded graphite is further heat treated in inert atmosphere at a temperature higher than 800° C. (e.g., 1000° C.) for several hours (e.g., 4 hours) to form the carbon material of the present invention.

Commercially available expandable graphite has been tested by heat treatment at a temperature up to 600° C. in the air. Graphite starts to burn from about 800° C. in the air. In order to use as a flame retardant, there has been not required flame test at a temperature over 800° C. In addition, conventional tests are only evaluated relative expansion rate and therefore, long time heating is not carried out. On the other hand, in the present invention, heat treatment is carried out twice with different temperatures. In the first heat treatment, the layer structure of graphene can be controlled by the heating speed and heating time. The second heat treatment is to enhance the conductivity of the graphene structure.

Figure 1A:
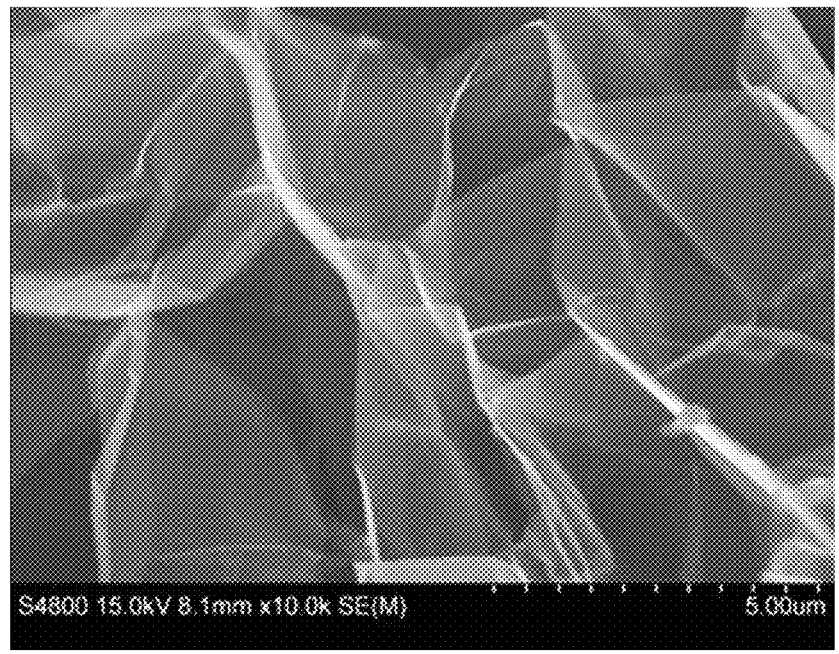
FIG. 1A: Scanning Electron Microscopy (SEM) image of carbon material according to the exemplary embodiment of the present invention.
Figure 1B:
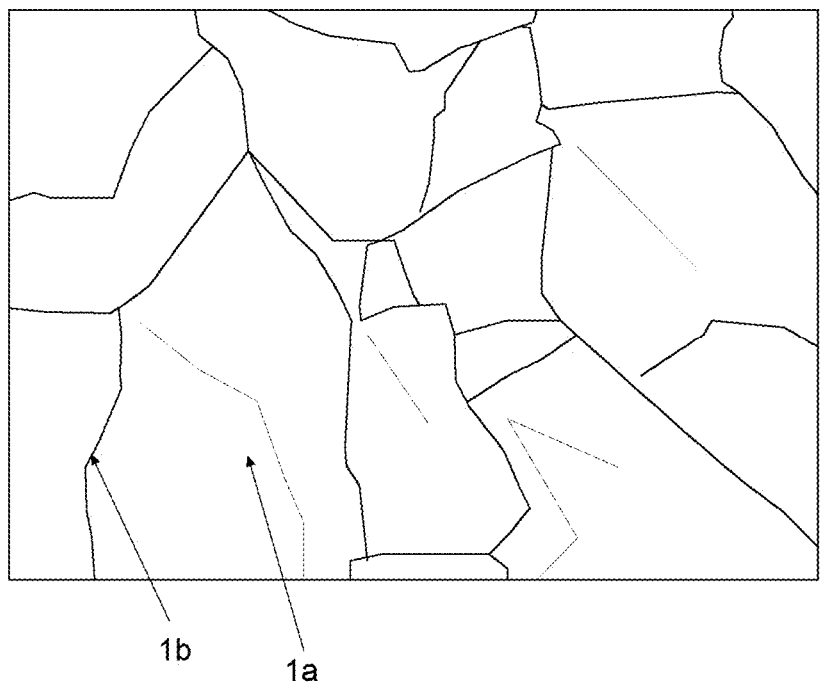
FIG. 1B: Pattern diagram of FIG. 1A.

Therefore, the carbon material of the present embodiment, in which at least one of walls of cells is a graphene single-layer wall, is new. Optionally, multilayer (2 to 50 layers) graphene walls can partially remain. In addition, the center portion of the carbon material can be graphite crystal phase. FIG. 1A shows Scanning Electron Microscopy (SEM) image of the carbon material according to this exemplary embodiment and FIG. 1B shows a pattern diagram of FIG. 1A. As shown in FIG. 1A, the plurality of cells 1a is partitioned by single-layer graphene wall 1b and the plurality of cells interconnect as a whole.

The size of the carbon material according to this exemplary embodiment can be less than 500 μm, preferably less than 100 μm, most preferably less than 50 μm. The size of the cells partitioned by several graphene single-layer walls and optionally few multilayer graphene walls can be 15 μm or less, preferably 10 μm or less, most preferably 1 μm or less.

The carbon material of the present embodiment is suitable for a carbon material used in lithium ion batteries (LiBs), particularly for negative electrode. Exemplary embodiments of LiBs according to the present invention will be specifically described below.

A. Anode Material for LiBs

An exemplary embodiment of the present invention relates to an anode material (i.e., negative electrode material) including the above carbon material and active particles that can store lithium ion. The active particles are smaller than the cell size to confine in the cell. The anode material according to this exemplary embodiment include the above carbon material and the active particles embedded in the cell of the carbon material and confined with amorphous carbon that covers the carbon material.

Fabrication Method 2

Figure 2:
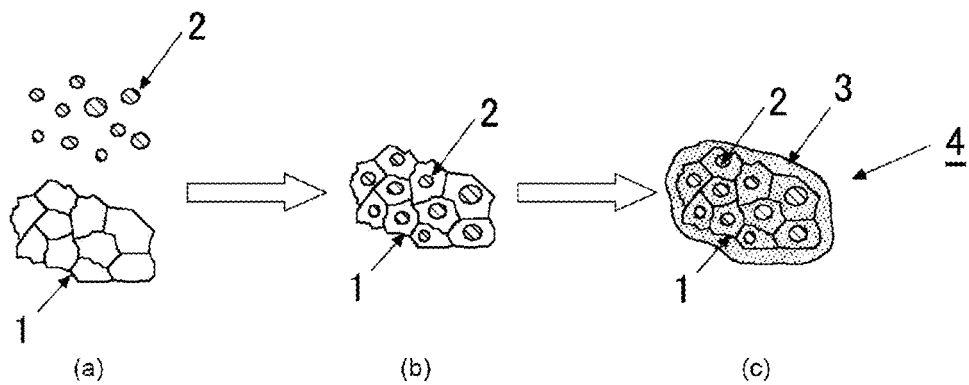
FIG. 2: Schematic diagram of manufacturing process of an anode material according to one exemplary embodiment of the present invention.

The fabrication procedure of the anode material according to this exemplary embodiment is described in FIG. 2.

(a) Carbon material 1 and fine active particles 2 such as nano silicon (nano-Si) and nano tin (nano-Sn) are used as starting materials (FIG. 2(a)).

(b) Carbon material 1 and fine active particles 2 are soak in an appropriate medium to prepare a suspension and then treated by sonication to make a structure that fine active materials 2 are embedded in the cells of carbon material 1 (FIG. 2(b)).

(c) The structure is separate from the medium and then covered with amorphous carbon 3 to confine active materials 2 by hydrothermal or CVD method (FIG. 2(c)). The anode material 4 according to this exemplary embodiment is completed.

The size of the active particles is smaller than the cell size of the carbon material and is preferably 1 μm or less, more preferably 500 nm or less, and most preferably 100 nm or less.

The active particles preferably include at least one of silicon, tin, iron and zinc and oxides thereof.

The amorphous carbon coated anode material can be milled to control the size thereof. The size of anode material can be 100 μm or less, preferably 50 μm or less, most preferably 20 μm or less.

Figure 3:
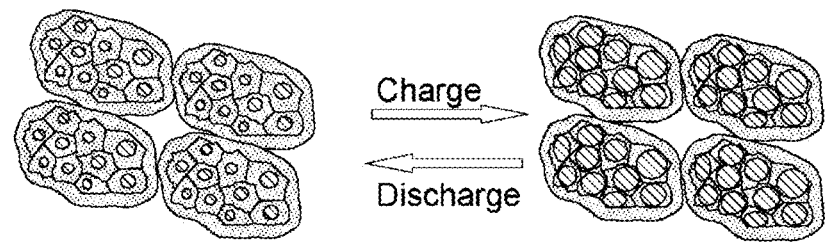
FIG. 3: Schematic diagram of state transition of an anode material according to one exemplary embodiment of the present invention between charging and discharging.

Benefits for This Structure:

(1). The individual active material can expand and extract inside of the cell (graphene grid) during lithiation and delithiation and the structure can prevent the active particles from pulverization. 3D graphene network is highly flexible so that it can easily accommodate to the volume change of the active materials as shown in FIG. 3, which is expected to make a long cycle life and high capacity anode for LiBs.

(2). The micro-size anode material will need less binder compared with only fine active particles.

(3). 3D graphene network is excellent in conductivity so that it can reduce the usage amount of conductive additives and higher power performance.

B. Spacer Additives

Figure 4:
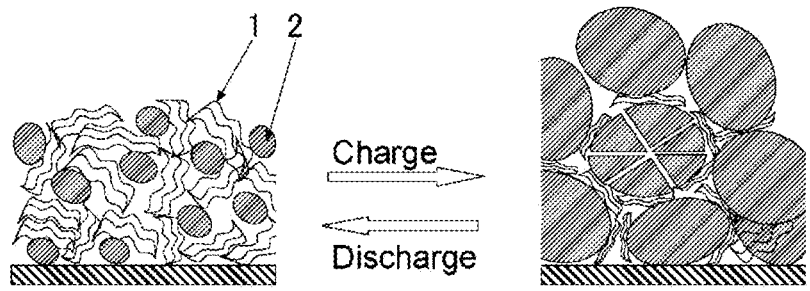
FIG. 4: Schematic diagram of state transition of an anode material according to another exemplary embodiment of the present invention between charging and discharging.

In this exemplary embodiment, the carbon material 1 according to the present invention is used as a spacer additive provided between the active particles 2 in a negative electrode as shown in FIG. 4.

The active materials 2 will have enough space to expand with the spacer additives, which will have less active material pulverization and current collector distortion.

In this exemplary embodiment, the active particles can use not only nano particles but also particles larger than the size of cells in the carbon material. The size of the active materials can be less than 10 μm, preferably less than 5 μm.

The spacer additives can be mixed with the active particles at a negative slurry preparation. In the slurry preparation, ultrasonic treatment can be employed to enhance distribution of the space additives.

C. Lithium Ion Battery

Another exemplary embodiment relates to a lithium-ion battery including a negative electrode comprising the anode material according to the above exemplary embodiment or the spacer additives. The battery also comprises a positive electrode comprising an active material, an electrolyte comprising a lithium salt dissolved in at least one non-aqueous solvent and a separator configured to allow electrolyte and lithium ions to flow between a first side of the separator and an opposite second side of the separator.

As for the positive electrode active material, but there is also no particular restriction on the type or nature thereof, known cathode materials can be used for practicing the present invention. The cathode materials may be at least one material selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof. The positive electrode active material may also be at least one compound selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$) and lithium manganese oxide (e.g., $LiMn_2O_4$ and $LiMnO_2$) because these oxides provide a high cell voltage. Lithium iron phosphate is also preferred due to its safety feature and low cost. All these cathode materials can be prepared in the form of a fine powder, nano-wire, nano-rod, nano-fiber, or nano-tube. They can be readily mixed with an additional conductor such as acetylene black, carbon black, and ultra-fine graphite particles. For the preparation of an electrode, a binder can be used. Examples of the binder include polytetrafluoroethylene (PTFE), polyvinylidene fluoride (PVDF), ethylene propylene diene copolymer (EPDM), or styrene-butadiene rubber (SBR). The positive and negative electrodes can be formed on a current collector such as copper foil for the negative electrode and aluminum or nickel foil for the positive electrode. However, there is no particularly significant restriction on the type of the current collector, provided that the collector can smoothly path current and have relatively high corrosion resistance. The positive and negative electrodes can be stacked with interposing a separator therebetween. The separator can be selected from a synthetic resin nonwoven fabric, porous polyethylene film, porous polypropylene film, or porous PTFE film.

A wide range of electrolytes can be used for manufacturing the cell. Most preferred are non-aqueous and polymer gel electrolytes although other types can be used. The non-aqueous electrolyte to be employed herein may be produced by dissolving an electrolyte (salt) in a non-aqueous solvent. Any known non-aqueous solvent which has been employed as a solvent for a lithium secondary battery can be employed. A mixed solvent comprising ethylene carbonate (EC) and at least one kind of non-aqueous solvent whose melting point is lower than that of ethylene carbonate and whose donor number is 18 or less (hereinafter referred to as a second solvent) may be preferably employed as the non-aqueous solvent. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous solvent solely composed of ethylene carbonate (EC) is advantageous in that it is relatively stable against decomposition through a reduction by a graphitized carbonaceous material. However, the melting point of EC is relatively high, 39-40° C., and the viscosity thereof is relatively high, so that the conductivity thereof is low, thus making EC alone unsuited for use as a secondary battery electrolyte to be operated at room temperature or lower. The second solvent to be used in the mixed solvent with EC functions to make the viscosity of the mixed solvent lowering than that of which EC is used alone, thereby improving an ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage. Preferable second solvents are dimethyl carbonate (DMC), methyl ethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C. The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

EXAMPLES

Example 1

3 g of expandable graphite was heated up to 250° C. with 1° C./min in $N_2$ atmosphere and kept at 250° C. for 3 h. Then, the heat treated graphite was further heated at 1000° C. for 4 h in $N_2$ atmosphere to prepare carbon material A.

Example 2

3 g of expandable graphite was heated up to 350° C. with 10° C./min in $N_2$ atmosphere and kept at 350° C. for 3 h. Then, the heat treated graphite was further heated at 1000° C. for 4 h in $N_2$ atmosphere to prepare carbon material B.

Comparative Example 1

Expandable graphite was used as it is as carbon material C.

Comparative Example 2

Nature graphite was used as it is as carbon material D.

BET specific surface area, average pore size and pore volume of carbon materials A-D were evaluated. The results are shown in Table 1.

TABLE 1

|  | BET specific surface area ($m^2/g$) | Average pore size (nm) | Pore volume ($m^3/g$) |
|---|---|---|---|
| Example 1 | 542 | 11.9 | 1.9 |
| Example 2 | 657 | 13.2 | 2.2 |
| Comp. Ex. 1 | 1 | 850 | 0.001 |
| Comp. Ex. 2 | 8 | 10.2 | 0.02 |

Average pore size and pore volume were evaluated by nitrogen absorption measurement.

Example 3

3 g of Si particles with an average diameter of 20 nm and 100 mg of the carbon material A prepared in Example 1 were dispersed in 20 ml of N-methylpyrrolidone (NMP). Ultrasonic treatment was performed for mixing the Si nano particles with graphene so as to help the Si nano particles fully embedding in cells of the carbon material. The resultant materials were separated by filtration, washed with deionized water and then dried. The dried materials were put in CVD apparatus to cover the whole of the material with amorphous carbon. Then, the resultant materials were milled by ball-milling to obtain anode materials with average particle size of 20 μm.

Example 4

Example 3 was repeated except for using the carbon material B prepared in Example 2 to obtain anode materials with average particle size of 25 μm.

Comparative Example 3

Si particles with diameter of 5 μm were used as an anode material.

Fabrication of Test Cells

Slurry was prepared by mixing each of anode materials Examples 3 and 4 and Comparative Example 3, carbon black, and polyimide in a weight ratio of 90:1:9 in NMP. The slurry was coated on a Cu foil and dried at 120° C. for 15 min to form a thin substrate. Then, the thin substrate was pressed to 45 μm thick with the loading density of 50 g/m² and then heat treated at 200° C. for 2 h in $N_2$ atmosphere to prepare a negative electrode.

The negative electrode was used as a working electrode, while a metal lithium foil was used as a counter electrode. A separator made of porous polypropylene film was interposed between the working electrode and counter electrode. The electrolyte prepared by dissolving $LiPF_6$ in a mixed solvent of ethyl carbonate (DEC) and ethylene carbonate (EC) in a ratio of 7:3 in a concentration of 1M, then a laminate half-cell was fabricated.

Example 5

1% by weight of carbon material A prepared in Example 1 as a spacer and 90% by weight of SnO particles with an average diameter of 5 μm were mixed in NMP with ultrasonication. Into the resultant product, 3% by weigh of conductive additive carbon black and 6% by weight of polyimide was mixed to prepare slurry. The slurry was coated on a Cu foil and dried at 120° C. for 15 min to form a thin substrate. Then, the thin substrate was pressed to 45 μm thick with the loading density of 50 g/m² and then heat treated at 250° C. for 2 h in $N_2$ atmosphere to prepare a negative electrode.

The negative electrode was used as a working electrode, while a metal lithium foil was used as a counter electrode. A separator made of porous polypropylene film was interposed between the working electrode and counter electrode. The electrolyte prepared by dissolving $LiPF_6$ in a mixed solvent of ethyl carbonate (DEC) and ethylene carbonate (EC) in a ratio of 7:3 in a concentration of 1M, then a laminate half-cell was fabricated.

The test cell was evaluated in initial charge capacity, coulombic efficiency, rate capabilities of 1 C charge/0.1 C discharge and 6 C charge/0.1 C discharge and capacity retention 1 C after 100 cycles. Results are shown in Table 2.

TABLE 2

|  | Capacity (mAh/g) | Columbic efficiency (%) | 1 C/ 0.1 C | 6 C/ 0.1 C | Capacity retention 1 C@ 100 (%) |
|---|---|---|---|---|---|
| Example 3 | 3600 | 68 | 0.72 | 0.32 | 45 |
| Example 4 | 3200 | 75 | 0.69 | 0.24 | 69 |
| Example 5 | 450 | 65 | 0.78 | 0.35 | 70 |
| Comparative example 3 | 3500 | 65 | 0.23 | 0.01 | 2.7 |

INDUSTRIAL APPLICABILITY

The carbon material of the present invention has relatively large cell size and excellent flexibility so that it can be used in various applications.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. An anode material for a lithium-ion battery comprising a carbon material comprising a three-dimensional graphene network constituting a plurality of cells interconnecting as a whole, where at least one of the cells has a single-layer graphene wall and the plurality of cells is formed by expansion of an expandable graphite, and active particles including at least one element that is able to store lithium ions; wherein the carbon material is formed by a first heat treatment in an inert atmosphere at 200-500° C. with 1° C./min to 10° C./min for more than one hour and, subsequently, a second heat treatment in an inert atmosphere at a temperature higher than 800° C.

2. The anode material according to claim 1, wherein the active particles are embedded in the cells and confined with amorphous carbon that covers the carbon material.

3. The anode material according to claim 2, wherein a size of the anode material is 100 μm or less.

4. The anode material according to claim 2, wherein a size of the cell in the carbon material is equal to or less than 15 μm and larger than a size of active particles.

5. The anode material according to claim 2, wherein a size of the active particles is 1 μm or less.

6. The anode material according to claim 2, wherein the active particles comprise at least one of silicon, tin, iron and zinc and oxides thereof.

7. The anode material according to claim 2, wherein the amorphous carbon comprises at least one element selected from boron, nitrogen and fluorine.

8. A negative electrode for a lithium-ion battery comprising the anode material according to claim 1.

9. A lithium ion battery comprising the negative electrode according to claim 8.

10. A negative electrode for a lithium-ion battery comprising the anode material according to claim 2.

11. A negative electrode for a lithium-ion battery comprising the anode material according to claim 3.

12. A negative electrode for a lithium-ion battery comprising the anode material according to claim 4.

13. A negative electrode for a lithium-ion battery comprising the anode material according to claim 5.

14. A negative electrode for a lithium-ion battery comprising the anode material according to claim 6.

15. A negative electrode for a lithium-ion battery comprising the anode material according to claim 7.

* * * * *